United States Patent
Ueno (10) Patent No.: US 12,361,767 B2
(45) Date of Patent: Jul. 15, 2025

(54) VEHICLE CONTROL SYSTEM

(71) Applicant: DENSO CORPORATION, Kariya (JP)

(72) Inventor: Kouji Ueno, Kariya (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 17/457,943

(22) Filed: Dec. 7, 2021

(65) Prior Publication Data

US 2022/0092888 A1 Mar. 24, 2022

Related U.S. Application Data

(63) Continuation of application No. PCT/JP2020/017907, filed on Apr. 27, 2020.

(30) Foreign Application Priority Data

Jun. 11, 2019 (JP) .................................. 2019-108847

(51) Int. Cl.
*B60K 35/10* (2024.01)
*B60K 35/00* (2006.01)
(Continued)

(52) U.S. Cl.
CPC .............. *G07C 5/008* (2013.01); *B60K 35/00* (2013.01); *G07C 5/0825* (2013.01); *B60K 35/10* (2024.01); *B60K 2360/143* (2024.01)

(58) Field of Classification Search
CPC .......... B60K 2370/11; B60K 2370/143; B60K 2370/1438; B60K 2370/152; B60K 2370/178; B60K 2370/195; B60K 35/00; B60R 16/02; B60W 50/02; B60W 50/10; B60W 50/14; G06F 3/0481; G07C 5/008; G07C 5/0825
See application file for complete search history.

(56) References Cited

U.S. PATENT DOCUMENTS 7,825,916 B2 * 11/2010 Yajima ................ G06F 11/1441
345/204
2005/0222726 A1 10/2005 Furui et al.
(Continued)

FOREIGN PATENT DOCUMENTS

JP 2000100271 A 4/2000
JP 2005297616 A 10/2005
(Continued)

OTHER PUBLICATIONS

Machine Translation of JP 2009119931 A obtained from Clarivate Analytics on Jul. 15, 2024 (Year: 2009).*

*Primary Examiner* — Fadey S. Jabr
*Assistant Examiner* — Michael J Herrera
(74) *Attorney, Agent, or Firm* — Harness, Dickey & Pierce, P.L.C.

(57) ABSTRACT

The vehicle control system that controls an interface unit for performing at least one of a notification to the user and an input by the user includes: an anomaly detection unit for detecting that there is an anomaly in the information transmission function between the interface unit and the user; and a notification processing unit that notifies an external device that an anomaly has occurred in the information transmission function by the interface unit when the anomaly detection unit detects an anomaly.

7 Claims, 5 Drawing Sheets

(51) Int. Cl.
*G07C 5/00* (2006.01)
*G07C 5/08* (2006.01)

(56) References Cited

U.S. PATENT DOCUMENTS

| | | | |
|---|---|---|---|
| 2009/0160732 A1* | 6/2009 | Kimura | B60K 35/00 340/425.5 |
| 2014/0071077 A1* | 3/2014 | Kang | G06F 3/0488 345/173 |
| 2015/0135120 A1* | 5/2015 | Tanaka | G06F 3/0481 715/773 |
| 2017/0060334 A1* | 3/2017 | Feng | G06F 11/2221 |
| 2017/0094268 A1* | 3/2017 | Gulati | G09G 5/39 |
| 2017/0364207 A1* | 12/2017 | Henderson | G06F 3/04186 |
| 2018/0074510 A1 | 3/2018 | Isaji et al. | |
| 2018/0131802 A1* | 5/2018 | Cho | G06F 3/04886 |
| 2018/0370365 A1* | 12/2018 | Lee | B60K 37/06 |
| 2019/0009797 A1* | 1/2019 | Liu | B60W 50/029 |
| 2019/0079540 A1* | 3/2019 | Yoon | G05D 1/0293 |
| 2019/0164461 A1* | 5/2019 | Tomioka | B60R 11/02 |
| 2020/0019457 A1* | 1/2020 | Takano | G06F 11/1004 |
| 2020/0097241 A1* | 3/2020 | You | G06F 3/1423 |
| 2020/0133259 A1* | 4/2020 | Van Wiemeersch | B60W 50/029 |
| 2020/0221057 A1* | 7/2020 | Shimoda | G09G 5/36 |
| 2020/0257284 A1* | 8/2020 | Hassani | B60W 50/10 |
| 2020/0327749 A1* | 10/2020 | Mo | B60K 35/00 |

FOREIGN PATENT DOCUMENTS

| | | | |
|---|---|---|---|
| JP | 2006-312380 | | 11/2006 |
| JP | 2009119931 | A * | 6/2009 |
| JP | 2012171597 | A | 9/2012 |
| JP | 2016179810 | A | 10/2016 |
| JP | 2017047721 | A | 3/2017 |

* cited by examiner

VEHICLE CONTROL SYSTEM

CROSS REFERENCE TO RELATED APPLICATION

The present application is a continuation application of International Patent Application No. PCT/JP2020/017907 filed on Apr. 27, 2020, which designated the U.S. and claims the benefit of priority from Japanese Patent Application No. 2019-108847 filed on Jun. 11, 2019. The entire disclosures of all of the above applications are incorporated herein by reference.

TECHNICAL FIELD

The present disclosure relates to a vehicle control system that controls an interface unit.

BACKGROUND

An interface unit is known that performs at least one of a notification to the user and an input by the user. This interface unit is defined as a HMI (Human Machine Interface). The interface unit is, for example, a display.

A conceivable technique provides a control device for determining whether or not there is an anomaly in a display. This control device also determines whether or not there is an anomaly in the automatic driving function. Then, when the display is out of order but the automatic driving function is normal, the speaker notifies that the display is out of order but there is no problem in traveling.

Further, the control device determines whether or not it is possible to switch from automatic driving to manual driving when there is an anomaly in the display. Then, if it is possible to switch to manual driving operation, the control device switches to the manual driving operation.

SUMMARY

According to an example, a vehicle control system that controls an interface unit for performing at least one of a notification to the user and an input by the user may include: an anomaly detection unit for detecting that there is an anomaly in the information transmission function between the interface unit and the user; and a notification processing unit that notifies an external device that an anomaly has occurred in the information transmission function by the interface unit when the anomaly detection unit detects an anomaly.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The vehicle is equipped with many control devices. Even if the control device according to the conceivable technique detects that there is an anomaly in the display, the other control device mounted on the vehicle (hereinafter referred to as an external device) does not change any control.

When the interface unit is also used by an external device, if the external device does not change the control even though the information transmission function by the interface unit is abnormal, there is a risk of inconvenience for the user.

In view of the above issues, a vehicle control system is provided such that inconvenience due to an anomaly in an information transmission function by an interface unit is unlikely to occur In one aspect of the present embodiments, the vehicle control system that controls an interface unit for performing at least one of a notification to the user and an input by the user includes: an anomaly detection unit for detecting that there is an anomaly in the information transmission function between the interface unit and the user; and a notification processing unit that notifies an external device that an anomaly has occurred in the information transmission function by the interface unit when the anomaly detection unit detects an anomaly.

In this way, the external device notified that the information transmission function by the interface unit has an anomaly can be controlled in response to the anomaly in the information transmission function by the interface unit. Therefore, even if an anomaly occurs in the information transmission function by the interface unit, the inconvenience caused by the anomaly in the information transmission function by the interface unit can be suppressed in the entire system including the vehicle control system and the external device.

Figure 1:
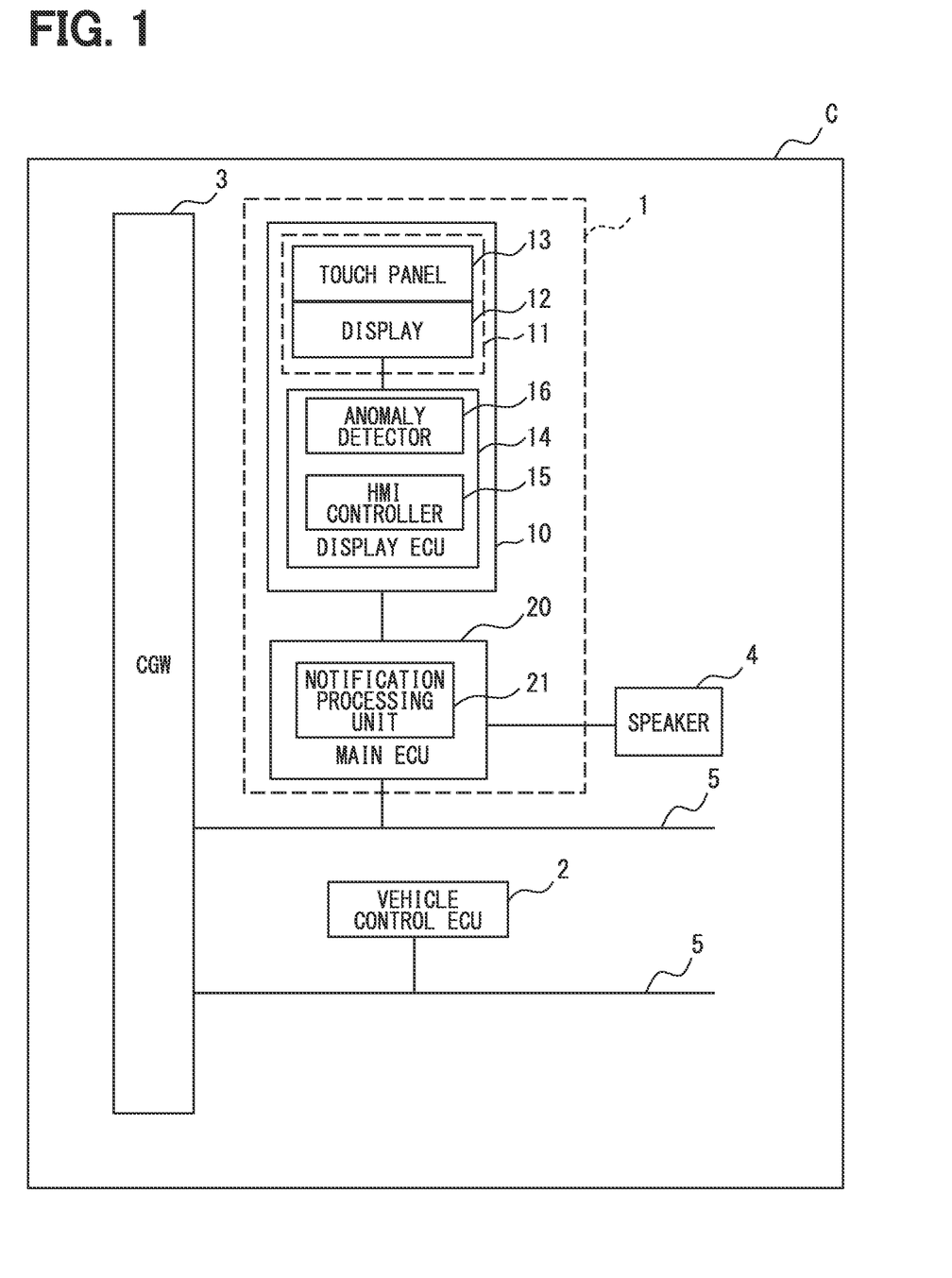
FIG. 1 is a diagram showing a configuration of an in-vehicle display system.

The following will describe an embodiment of the present disclosure with reference to the drawings. FIG. 1 is a diagram showing a configuration of an in-vehicle display system 1 which is a vehicle control system. The in-vehicle display system 1 is mounted on the vehicle C. The in-vehicle display system 1 is a system that can display various information to the occupants of the vehicle C and allow the occupants to operate various devices mounted on the vehicle C. In addition to the in-vehicle display system 1, the vehicle C is also equipped with a vehicle control ECU 2, a central gateway 3, a speaker 4, and the like.

The vehicle control ECU 2 is an ECU that controls the travelling of the vehicle C. For example, the vehicle control ECU 2 may be an ECU for performing automatic stop control for automatically decelerating and stopping the vehicle C when an obstacle is detected ahead of the vehicle. The automatic stop control can be turned on and off by the user via the in-vehicle display system 1. In a case where the user may need to turn off automatic stop control, for example, it is considered that the sensor falsely detects an obstacle. In addition, when the vehicle C is located inside the railroad crossing, the barrier is lowered and blocks the passage, so there are times when the vehicle C has to push the barrier and go out of the railroad crossing.

The central gateway 3 is a kind of gateway, and connects a plurality of networks provided in the vehicle C to each other. The speaker 4 is connected to the in-vehicle display system 1. The installation position of the speaker 4 is in the passenger compartment of the vehicle C. A plurality of LAN buses 5 are network lines and are provided in the vehicle C. Each LAN bus 5 is connected to the central gateway 3. Various ECUs are connected to each LAN bus 5. The network line is a communication line that performs any one of many-to-many, one-to-many, or many-to-one communication.

[Configuration of In-Vehicle Display System 1]

The in-vehicle display system 1 has a configuration including a display unit 10 and a main ECU 20. The display unit 10 includes an interface unit 11 and a display ECU 14.

The interface unit 11 is a portion that performs at least one of a notification to the user and an input by the user. In other words, the interface unit 11 is a part that transmits information with the user. Specifically, the interface unit 11 includes a display 12 for notifying the user and a touch panel 13 for inputting by the use.

The display 12 is installed in a place where an occupant such as a driver can reach out and touch in the passenger compartment of the vehicle C. The display 12 may be a liquid crystal display or an organic EL display, and there is no limitation on the display method. The touch panel 13 is superimposed on the display screen of the display 12. The touch panel 13 may be a capacitance type panel or a pressure sensitive type panel, and there is no limitation on the operation detection method of the touch panel 13.

[Configuration of Display ECU 14]

The display ECU 14 is connected to the display 12 on a one-to-one basis. Alternatively, the feature may not be limited to this, and other displays may be connected to the display ECU 14. That is, the display ECU 14 may be connected to a plurality of displays on a one-to-many basis. Further, the display ECU 14 is also connected to the touch panel 13 on a one-to-one basis. The display ECU 14 can be realized by a configuration including at least one processor. For example, the display ECU 14 can be realized by a computer equipped with a CPU, a ROM, a RAM, an I/O, and bus lines connecting these components, and the like. The ROM stores a program to make a general-purpose computer function as a display ECU 14. The display ECU 14 functions as the HMI control unit 15 and the anomaly detection unit 16 when the CPU executes the program stored in the ROM while using the temporary storage function of the RAM. The execution of these functions means that a method corresponding to the program is executed.

The HMI control unit 15 controls the display 12 and the touch panel 13 which are the interface units 11. Specifically, the HMI control unit 15 generates data corresponding to a figure to be displayed on the display 12. Then, by outputting the data to the display 12, the figure is displayed on the display 12. The main ECU 20 controls what kind of figure is to be displayed on the display 12. Further, the HMI control unit 15 acquires a signal output from the touch panel 13, and identifies a position operated by the user on the touch panel 13 based on the signal.

The anomaly detection unit 16 inspects the display 12 and the touch panel 13 which are the interface units 11 and detects an anomaly occurring in them. As a result, the anomaly of the display 12 means that the figure to be displayed on the display 12 is not displayed. Therefore, the anomaly of the display 12 includes the case where the display 12 itself has an anomaly. Further, the anomaly of the display 12 includes an anomaly of a circuit provided for displaying information on the display 12. As a result, the state in which the figure to be displayed on the display 12 is not displayed can be said to be a state in which an anomaly has occurred in the information transmission function using the display 12.

Specific examples of the anomaly of the display 12 include an anomaly of the backlight when the display 12 is a liquid crystal display and an anomaly of energization of the liquid crystal panel. Whether or not an anomaly in the backlight or an anomaly in energization of the liquid crystal panel has occurred can be determined by detecting the voltage of the line for energizing them. When the display 12 is an organic EL display, a specific example of the anomaly is an anomaly in energization of the organic EL panel.

Other examples of the anomaly of the display 12 include an anomaly of the communication line between the display ECU 14 and the display 12, an anomaly of the communication line between the main ECU 20 and the display ECU 14, and the like. An anomaly in the communication line can be detected, for example, by not transmitting data via the communication line for a certain period of time or longer during continuous data communication.

The anomaly of the touch panel 13 includes, for example, on sticking, circuit opening, circuit short circuit, and the like. On-sticking is an anomaly in which the signal supplied from the touch panel 13 is a signal indicating that a certain part of the touch panel 13 is being touched all the time. Circuit open and circuit short can be judged from the voltage value as in the case of a normal electronic circuit.

The anomaly of the display 12 and the anomaly of the touch panel 13 include not only the anomaly of the hardware but also the anomaly of the software. Software anomalies include software freezes. Software anomalies also include temporary anomalies. Temporary software abnormalities include reset processing by monitoring software such as the watchdog timer, and restarting.

The anomaly detection unit 16 separately detects the anomaly of the display 12 and the anomaly of the touch panel 13. Then, when it is detected that there is an anomaly in either the display 12 or the touch panel 13, the main ECU 20 is notified of the anomaly. In addition, the anomaly detection unit 16 also detects that the anomaly has been resolved after detecting the anomaly. Then, when it is detected that the anomaly has been resolved, the main ECU 20 is notified that the anomaly has been resolved.

[Configuration of Main ECU 20]

The display ECU 14 and the main ECU 20 are connected to each other via one-to-one manner. Alternatively, as described above, the display ECU 14 may be connected to a plurality of displays via one-to-many manner. Like the display ECU 14, the main ECU 20 can also be realized by a configuration including at least one processor. For example, the main ECU 20 can be realized by a computer equipped with a CPU, a ROM, a RAM, an I/O, and bus lines connecting these components, and the like. The ROM stores a program to make a general-purpose computer function as a main ECU 20. The main ECU 20 functions as a notification processing unit 21 or the like when the CPU executes a program stored in the ROM while using the temporary storage function of the RAM. In addition, the execution of the program means that the method corresponding to the program is executed.

In addition to the notification processing unit 21, the function executed by the main ECU 20 is a function of determining a figure to be displayed on the display 12 and instructing the display ECU 14 to display the figure on the display 12. The main ECU 20 is also connected to the speaker 4, and the main ECU 20 outputs a sound signal to the speaker 4.

Further, the anomaly of the interface unit 11 includes an anomaly of the display ECU 14 that controls the interface unit 11. It may be difficult for the display ECU 14 to determine its own anomaly. Therefore, the main ECU 20 may be provided with a part or all of the functions of the anomaly detection unit 16.

When the anomaly detection unit 16 detects that there is an anomaly in the interface unit 11, the notification processing unit 21 notifies the external device that the information transmission function by the interface unit 11 has an anomaly. The external device means a device outside the in-vehicle display system 1. The notification processing unit 21 is connected to the external device via the LAN bus 5. FIG. 1 shows a vehicle control ECU 2 as an external device. Further, the central gateway 3 may also be considered as an external device. The vehicle control ECU 2 can be operated such as on/off switching of the touch panel 13.

In the present embodiment, when the anomaly detection unit 16, that is, the display ECU 14 notifies that the interface unit 11 has an anomaly, the notification processing unit 21 notifies the vehicle control ECU 2 of the anomaly. Further, when the anomaly detection unit 16 notifies that the anomaly has been resolved, the vehicle control ECU 2 is notified that the anomaly has been resolved. The notification processing unit 21 also performs a process of notifying the user that an anomaly has occurred in the interface unit 11. This notification is provided by the display 12 when the display 12 is normal. When the display 12 is abnormal, the speaker 4 is used.

When the interface unit 11 is notified that an anomaly has occurred, the vehicle control ECU 2 changes the control setting to a preset fail-time setting even if no user operation is performed. The fail-time setting is a setting on the safe side in consideration of the fact that the user cannot operate the interface unit 11. For example, when the specific control controlled by the vehicle control ECU 2 is the above-mentioned automatic stop control, the vehicle control ECU 2 turns off the automatic stop control when notified that an anomaly has occurred in the interface unit 11. The off setting of the automatic stop control is the fail setting. Since the automatic stop control is turned off, it is possible to avoid a situation such that the driver of the vehicle C cannot turn off the automatic stop control due to a failure of the touch panel 13 even though the automatic stop control needs to be turned off.

[Flow of Processing Executed by the Display ECU 14]

Figure 2:
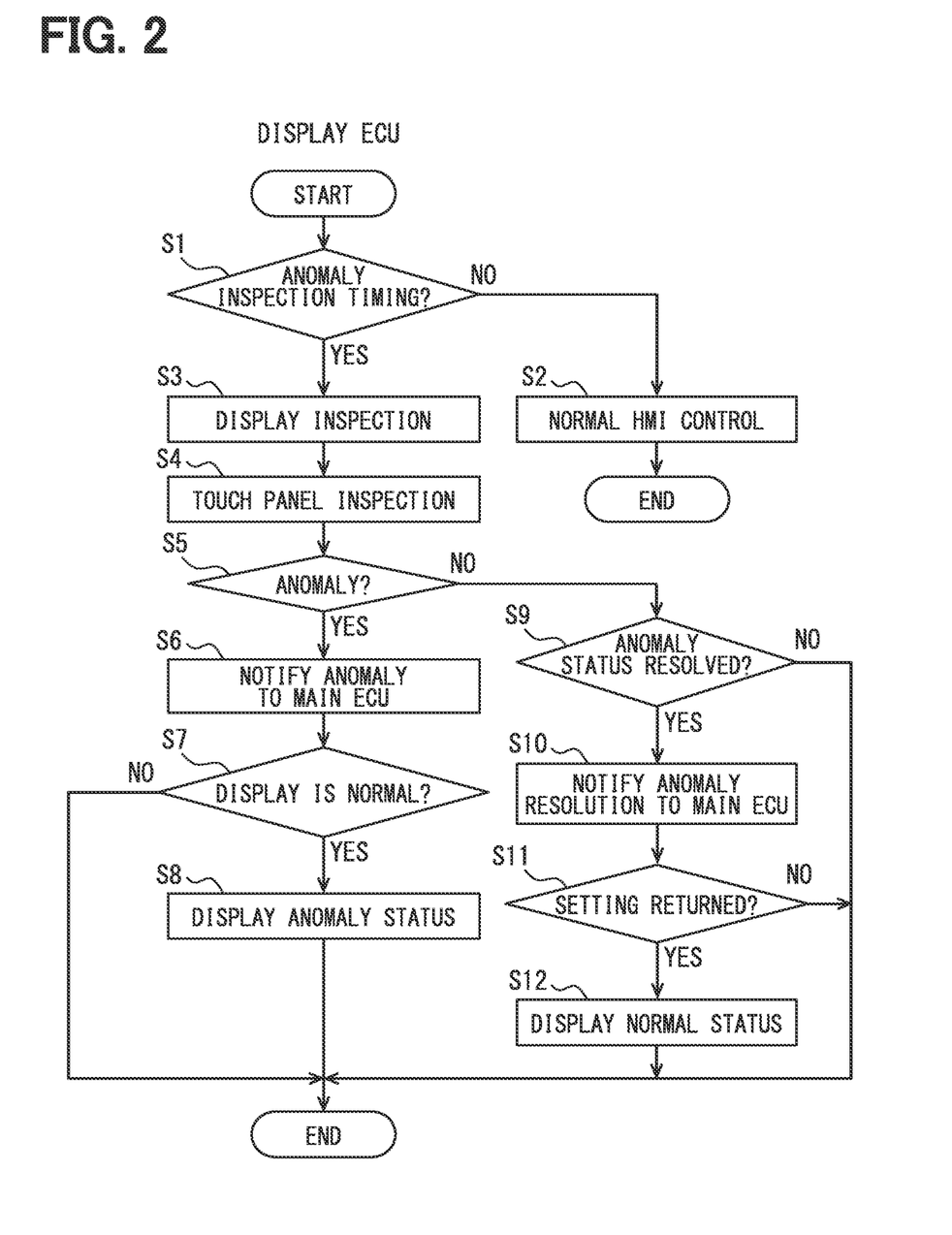
FIG. 2 is a diagram showing an example of a flow of processing executed by the display ECU.

FIG. 2 shows an example of the flow of processing executed by the display ECU 14. The display ECU 14 periodically executes the process shown in FIG. 2 during startup. In FIG. 2, the HMI control unit 15 executes the step (hereinafter, the step is omitted) S2, and the anomaly detection unit 16 executes the other steps.

In S1, it is determined whether or not it is the anomaly inspection timing. The anomaly inspection timing can be set arbitrarily. The anomaly inspection timing can be, for example, a fixed cycle, a timing when the display unit 10 is activated, or the like.

When it is not the anomaly inspection timing, the determination result of S1 becomes "NO" and the process proceeds to S2. In S2, normal HMI control is executed. In the normal HMI control, a figure instructed by the main ECU 20 is drawn on the display 12. Further, the touch panel 13 detects the position operated by the user and notifies the main ECU 20.

When the determination result of S1 is YES, the process proceeds to S3. In S3, it is inspected whether or not the display 12 has an anomaly. In S4, it is inspected whether or not the touch panel 13 has an anomaly. Then, in S5, as a result of the inspections in S3 and S4, it is determined whether or not an anomaly has occurred in at least one of the display 12 and the touch panel 13. If at least one of the display 12 and the touch panel 13 has an anomaly, the determination result in S5 is "YES". When the determination result of S5 is "YES", the process proceeds to S6.

In S6, the main ECU 20 is notified that an anomaly has occurred, together with information for identifying the interface unit 11 in which the anomaly has detected. This notification will be referred to as an anomaly status notification below. The main ECU 20 that has acquired the anomaly status notification notifies the vehicle control ECU 2, which is an example of the external device, that there is an anomaly in the interface unit 11 together with information for identifying the interface unit 11 having the anomaly.

The external device to which the main ECU 20 notifies the anomaly of the interface unit 11 is set in advance. The external device to which the anomaly is notified may be determined depending on what the interface unit 11 is specifically. Further, regardless of what the interface unit 11 is, the same external device may be notified of the anomaly of the interface unit 11. The number of external devices to be notified may be one or a plurality.

The vehicle control ECU 2 notified that the interface unit 11 has an anomaly may change the control setting according to the anomaly. For example, when the vehicle control ECU 2 is an ECU that performs the above-mentioned automatic stop control and the automatic stop control is in an on state, the vehicle control ECU 2 turns off the automatic stop control in a case where the anomaly of the display 12 is notified and/or a case where the anomaly of the touch panel 13 is notified.

When there is an anomaly in the display 12, the user cannot recognize where on the display 12 the button for switching on and off the automatic stop control is displayed. Therefore, it may be considered difficult for the user to turn off the automatic stop control. Further, when there is an anomaly in the touch panel 13, the user cannot operate the touch panel 13 to turn off the automatic stop control. Therefore, when the automatic stop control is in the on state, the vehicle control ECU 2 turns off the automatic stop control even when the anomaly of the display 12 is notified and/or even when an anomaly of the touch panel 13 is notified. When the setting of the automatic stop control is changed to be off, the vehicle control ECU 2 transmits a setting status notification indicating that the setting has been changed to the main ECU 20 via the central gateway 3.

When the main ECU 20 receives the setting status notification from the external device and the display 12 is normal, the main ECU 20 outputs an instruction, to display the setting status shown in the setting status notification on the display 12, to the display ECU 14. This instruction is output in S25 in FIG. 3 described below.

In S7, the display 12 determines whether or not it is normal. When the determination result of S7 is NO, the process shown in FIG. 2 is ended. In this case, the speaker 4 notifies that the touch panel 13 and the display 12 have an anomaly by the processing of the notification processing unit 21 of the main ECU 20.

When the determination result of S7 is "YES", the process proceeds to S8. When proceeding to S8, the touch panel 13 is abnormal, but the display 12 is normal. In S8, the display 12 indicates that the touch panel 13 is in an anomaly state. When an instruction to display the changed setting on the display 12 is acquired from the main ECU 20, information indicating the changed setting is displayed on the display 12.

When the determination result of S5 is NO, that is, in the normal state, the process proceeds to S9. In S9, it is determined whether or not the anomaly state has been resolved after the anomaly state. When the determination result of S9 is NO, the process shown in FIG. 2 is ended. When the determination result of S9 is "YES", the process proceeds to S10.

In S10, the main ECU 20 is notified that the anomaly has been resolved. This notification will be referred to as an anomaly resolution notification below. The main ECU 20 that has acquired the anomaly resolution notification notifies the external device, to which the anomaly has been previously notified, that the anomaly has been resolved. The external device notified from the main ECU 20 that the anomaly has been resolved returns the changed setting to the setting before the change. Then, the main ECU 20 is notified that the setting has been restored. When the main ECU 20 is notified that the settings of the external device have been restored, the main ECU 20 outputs an instruction to display the information indicating that the settings have been restored on the display 12 to the display ECU 14.

In S11, it is determined whether or not an instruction for displaying that the setting has been returned has been obtained from the main ECU 20. When the determination result of S11 is NO, the process shown in FIG. 2 is ended. When the determination result of S11 is YES, the process proceeds to S12.

In S12, the return of the setting, that is, the normal state is displayed on the display 12 together with the information indicating what the setting is.

[Flow of Processing Executed by the Notification Processing Unit 21 of the Main ECU 20]

Figure 3:
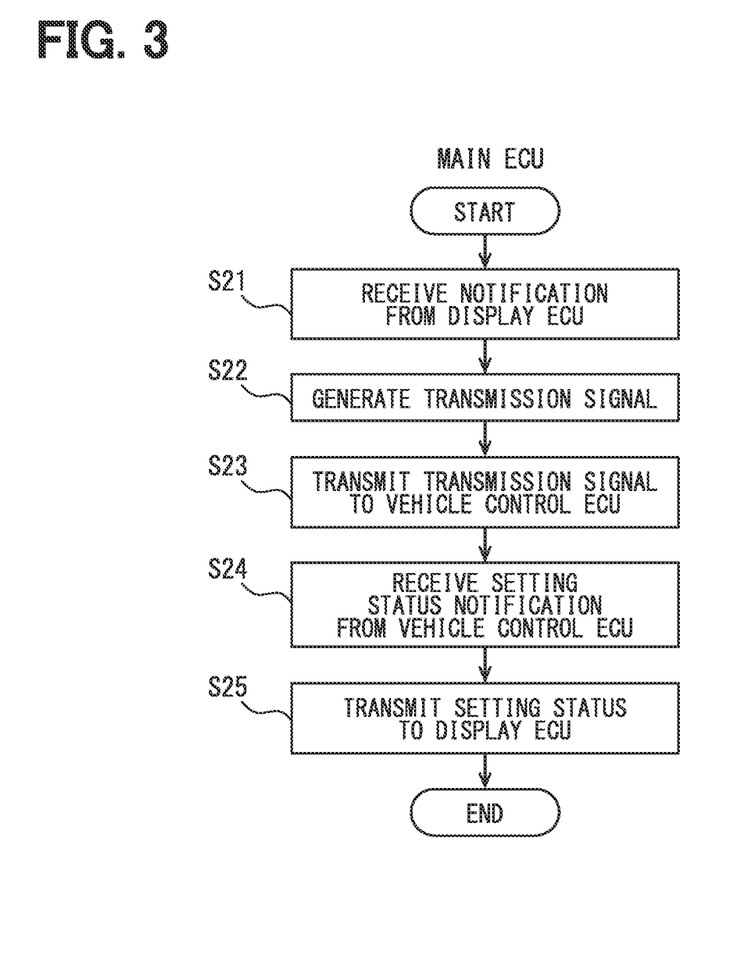
FIG. 3 is a diagram showing a process executed by a notification processing unit in the main ECU.

FIG. 3 shows a process executed by the notification processing unit 21 of the main ECU 20 when the display ECU 14 notifies the anomaly status notification or the anomaly resolution notification. S21 is a step of receiving the anomaly state notification or the anomaly resolution notification. Although this step is described in S21 to make the explanation easier to understand, the process shown in FIG. 3 is a process to be executed when this notification is received.

In S22, a transmission signal to be transmitted to the external device is generated. When the notification transmitted from the display ECU 14 is an anomaly state notification, the transmission signal includes information for identifying the interface unit 11 having an anomaly. When the notification transmitted from the display ECU 14 is an anomaly resolution notification, the transmission signal includes information for identifying the interface unit 11 for which the anomaly has been resolved.

In S23, the transmission signal generated in S22 is transmitted to the vehicle control ECU 2. Upon receiving this transmission signal, the vehicle control ECU 2 changes the setting to be determined according to the anomaly notified by the transmission signal or the resolution of the anomaly. Then, the main ECU 20 is notified of the setting status notification indicating the changed setting. In S24, the main ECU 20 receives the setting status notification.

In S25, an instruction to display the setting state indicated in the setting state notification on the display 12 is output to the display ECU 14. When proceeding to S8 or S12 of FIG. 2 after the process of S25 is executed, the changed setting is displayed on the display 12. When an anomaly has occurred in the display 12, instead of displaying the setting state on the display 12, a message indicating the setting state is output from the speaker 4. Further, a message indicating that an anomaly has occurred in the interface unit 11 is also output from the speaker 4.

[Display Example of Display 12]

FIGS. 4 to 7 conceptually show a display example displayed in a part of the display area 12a of the display 12 when the display ECU 14 executes the process in FIG. 2. FIGS. 4 to 7 show an A function display button 17 and a B function display button 18.

The A function display button 17 indicates the operating state of the A function. Further, the A function display button 17 also functions as a switch for switching the A function on/off by being combined with the touch panel 13 superimposed on the display 12. The B function display button 18 indicates the operating state of the B function. Further, the B function display button 18 also functions as a switch for switching the B function on/off by being combined with the touch panel 13 superimposed on the display 12. The A function and the B function may be any function.

Figure 4:
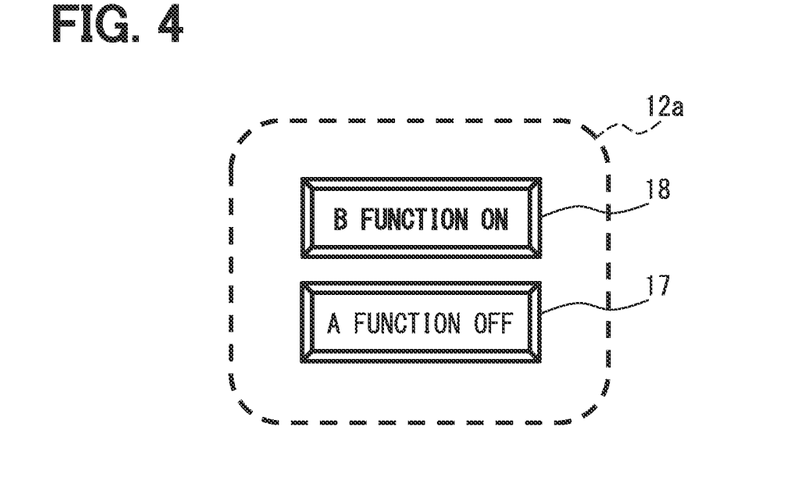
FIG. 4 is a display example of a display when the interface unit is in a normal state.
Figure 5:
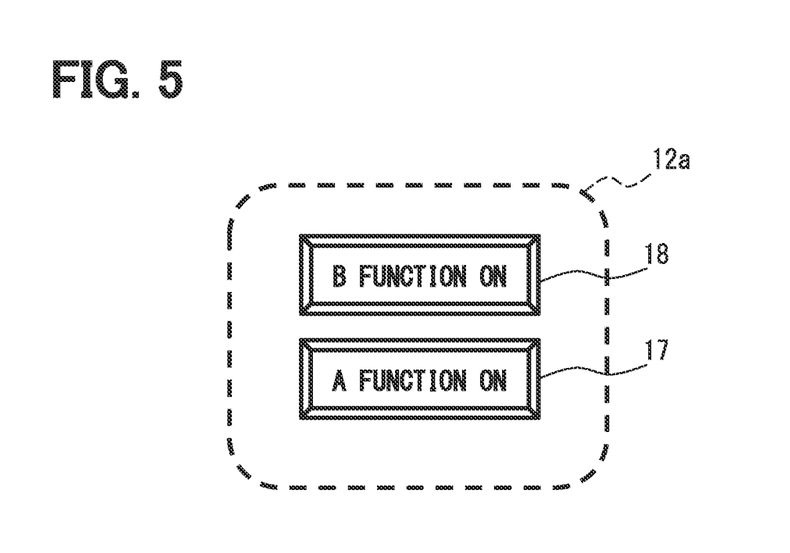
FIG. 5 is a display example of a display when the interface unit is in a normal state.

FIG. 4 is a display example when the interface unit 11 is in the normal state. In FIG. 4, the A function display button 17 indicates that the A function is off. Further, the B function display button 18 indicates that the B function is on. FIG. 5 is also a display example when the interlace unit 11 is in the normal state. In FIG. 5, the A function display button 17 is changed to a display indicating that the A function is on. The change of the display mode from FIG. 4 to FIG. 5 is executed in the normal HMI control described in S2.

In normal HMI control, when the part of the A function display button 17 of the touch panel 13 is touch-operated, the display ECU 14 outputs a signal indicating the touch operation position to the main ECU 20. The main ECU 20 determines that the A function display button 17 has been touch-operated from the touch operation position. Then, the vehicle control ECU 2 is notified of this. When the vehicle control ECU 2 is notified that the A function display button 17 has been touch-operated, the vehicle control ECU 2 turns the A function from off to on. Then, the main ECU 20 is notified that the A function has been turned on. Upon receiving the notification from the vehicle control ECU 2 that the A function has been turned on, the main ECU 20 outputs an instruction, to change the A function display button 17 to be on, to the display ECU 14. When the display ECU 14 that receives this instruction changes the display mode of the A function display button 17 according to the instruction, the A function display button 17 changes from the mode shown in FIG. 4 to the mode shown in FIG. 5.

Figure 6:
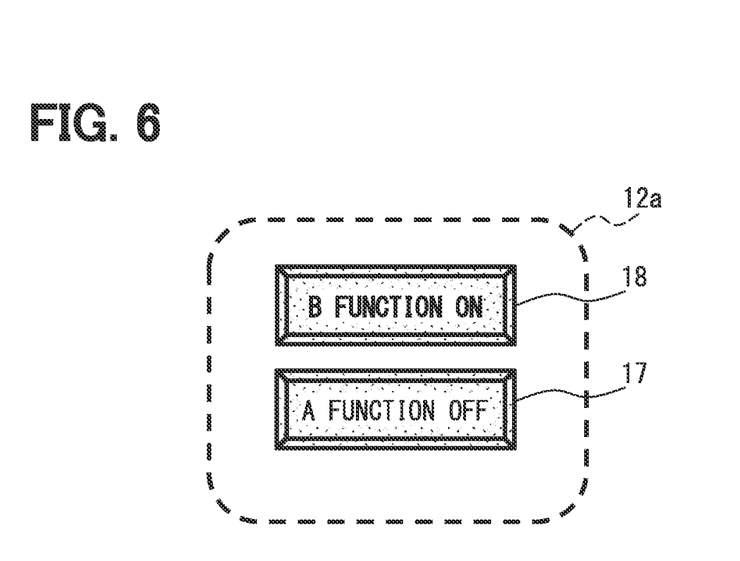
FIG. 6 is a display example of a display when the interface unit is in an abnormal state.

FIG. 6 is a display example in the case where it is determined that there is an anomaly in S5 and S8 is executed in the state of the display example shown in FIG. 5. In FIG. 6, both the A function display button 17 and the B function display button 18 are grayed out and displayed. The A function display button 17 indicates that the A function is off. On the other hand, the B function display button 18 changes to a grayed out display while indicating that the B function is on. This is because the A function is set to be turned off when the interface unit 11 is in an anomaly state, while the B function is set to be turned on. Further, in the example of FIG. 6, all the buttons displayed on the display 12 are grayed out and displayed to indicate that the touch panel 13 cannot be operated.

The display example for displaying the anomaly state of the touch panel 13 may not be limited to the example in which all the buttons are grayed out and displayed. For example, instead of graying out the button and displaying it, a message indicating that the touch panel 13 has an anomaly and the operation cannot be accepted may be displayed in the display area near the button. Further, while displaying all the buttons in gray out, a message indicating that the touch panel 13 has an anomaly and the operation cannot be accepted may be displayed.

Figure 7:
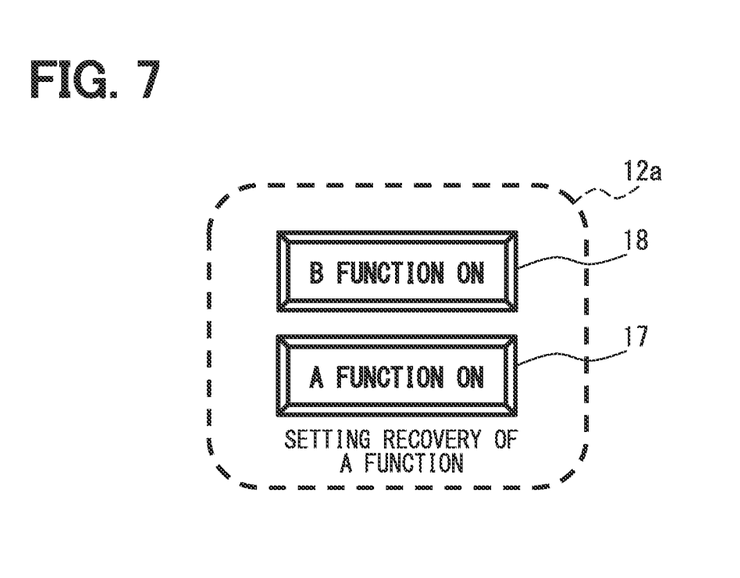
FIG. 7 is a display example of a display when the interface unit returns to the normal state.

FIG. 7 is a display example when S12 is executed after it is determined that there is no anomaly in S5. In FIG. 7, both the A function display button 17 and the B function display button 18 are also released from the gray-out display, and are shown in normal display colors. Further, at this time, since S10 and S11 are being executed, the A function is automatically returned to be on. Therefore, in FIG. 7, the A function display button 17 returns to the display indicating that the A function is on.

The A function display button 17 returns to the display indicating that the A function is on, and the gray-out display is also canceled, so that the function whose setting has been returned is the setting related to the A function. In addition, FIG. 7 also shows the characters "returning the setting of the A function". This character may be displayed only for a certain period of time. By displaying this character, the occupant of the vehicle C can easily recognize that the setting has been returned. Further, instead of or in addition to this character, a character indicating what the interface unit 11 has returned to the normal state may be displayed on the display 12.

In the in-vehicle display system 1 of the present embodiment described above, the anomaly detection unit 16 detects that an anomaly has occurred in the information transmission function of the interface unit 11. When the anomaly detection unit 16 detects the anomaly, the notification processing unit 21 notifies the vehicle control ECU 2, which is an external device, that an anomaly has occurred in the information transmission function by the interface unit 11.

By acquiring this notification, the vehicle control ECU 2 can perform control corresponding to an anomaly in the information transmission function by the interface unit 11. Therefore, even if the information transmission function by the interface unit 11 is in an anomaly state, the system including the in-vehicle display system 1 and the vehicle control ECU 2 can suppress the inconvenience caused by the anomaly in the information transmission function by the interface unit 11.

Further, in the in-vehicle display system 1 of the present embodiment, when the anomaly detection unit 16 detects that an anomaly has occurred in the interface unit 11, it notifies the user of that fact. Therefore, the user can recognize that the interface unit 11 has an anomaly.

The following are specific examples of inconvenience caused by an anomaly in the information transmission function of the interface unit 11 and the inconvenience that can be suppressed. Although an anomaly has occurred in the touch panel 13, when the display 12 is normal, unlike the case where the display 12 has an anomaly, it is difficult to recognize that the display 12 is anomaly in appearance. Therefore, the user may continue to operate the touch panel 13 even if he/she tries to perform the operation using the touch panel 13 without noticing the anomaly. As a result, there is a concern that the setting cannot be changed quickly.

However, in the present embodiment, the notification processing unit 21 notifies the vehicle control ECU 2 that changes the setting by the touch panel 13 that the display 12 is normal but the touch panel 13 is anomaly. As a result, the vehicle control ECU 2 changes the control setting to the fail time setting. Therefore, it is possible to prevent the setting change from being delayed.

Further, in the present embodiment, when the touch panel 13 has an anomaly but the display 12 is normal, the display 12 indicates that the touch panel 13 cannot be operated. As a result, it is possible to prevent the user from trying to perform the operation using the touch panel 13 even though the operation using the touch panel 13 cannot be performed.

Although the embodiments have been described above, the disclosed technology is not limited to the above-described embodiment, and the following modifications are included in the present disclosure, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

(First Modification)

For example, in the embodiment, the main ECU 20 specifies a transmission destination and transmits a transmission signal. Alternatively, the transmission signal may be transmitted without specifying the transmission destination, and the external device that has received the transmission signal may determine whether to change the setting from the information included in the transmission signal.

(Second Modification)

The ECU described in the present disclosure is a control unit. The control unit and the method described in the present disclosure may be implemented by a special purpose computer including a processor programmed to perform one or more functions embodied by a computer program. Alternatively, the control unit and the method described in the present disclosure may be implemented by a dedicated hardware logic circuit. Alternatively, the control unit and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a dedicated computer provided by configuring a processor with one or more dedicated hardware logic circuits. Alternatively, the controller and the method thereof described in the present disclosure may be implemented by a combination of (i) a special purpose computer including a processor programmed to execute one or more functions by executing a computer program and a memory and (ii) a special purpose computer including a processor with one or more dedicated hardware logic circuits. Further, the computer program may be stored in a computer-readable non-transitory tangible storage medium as instructions executed by a computer.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

Although the disclosure has been described in accordance with the embodiments, it is understood that the present disclosure is not limited to such embodiment or structures. The present disclosure incorporates various modifications and variations within the scope of equivalents. In addition, various combinations and forms, and further, other combinations and forms including only one element, or more or less than these elements are also within the sprit and the scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control system that controls an interface unit for performing at least an input by a user, the vehicle control system comprising:
   the interface unit;
   an anomaly detection unit that detects an anomaly in an information transmission function of the interface unit with the user;
   a notification processing unit that notifies an external device that the anomaly has occurred in the information transmission function of the interface unit when the anomaly detection unit detects the anomaly; and
   a vehicle control ECU that performs automatic stop control for automatically decelerating and stopping the vehicle when an obstacle is detected ahead of the vehicle, wherein:
   the external device is operable by the user through the interface unit, and controls a travelling of a vehicle;
   the interface unit includes a display and a touch panel superimposed over a display screen of the display;
   the anomaly detection unit separately detects both the display anomaly and the touch panel anomaly;
   the display anomaly is a state in which a figure to be displayed on the display is not displayed;
   the touch panel anomaly is a state in which the touch panel cannot be operated; and
   when the automatic stop control is in an on state, the vehicle control ECU turns off the automatic stop control in a case where the display anomaly is detected and/or a case where the touch panel anomaly is detected.

2. The vehicle control system according to claim 1, wherein:
   after detecting the anomaly, the anomaly detection unit detects that the anomaly has been resolved; and
   after notifying the external device that the anomaly has occurred, the notification processing unit notifies the external device that the anomaly has been resolved when the anomaly detection unit detects that the anomaly has been resolved.

3. The vehicle control system according to claim 1, wherein:
   the vehicle control system and the external device are connected via a network line.

4. The vehicle control system according to claim 1, wherein:
   the anomaly detection unit detects the anomaly of the touch panel and the anomaly of the display, independently.

5. The vehicle control system according to claim 4, wherein:
   the notification processing unit notifies the external device, which executes a control using a signal supplied from the touch panel, that the display is normal and the touch panel is anomaly when the anomaly detection unit detects that the display is normal and the touch panel is anomaly.

6. The vehicle control system according to claim 5, wherein:
   the notification processing unit notifies the external device, which executes a control using a signal supplied from the touch panel, that the display is normal and the touch panel is anomaly, and displays information indicating that the touch panel is inoperable on the display when the anomaly detection unit detects that the display is normal and the touch panel is anomaly.

7. A vehicle control system that controls an interface unit for performing at least an input by a user, the vehicle control system comprising:
   the interface unit;
   one or more processors;
   a vehicle control ECU that performs automatic stop control for automatically decelerating and stopping the vehicle when an obstacle is detected ahead of the vehicle; and
   a memory coupled to the one or more processors and storing program instructions that when executed by the one or more processors cause the one or more processors to at least:
   detect an anomaly in an information transmission function of the interface unit with the user; and
   notify an external device that the anomaly has occurred in the information transmission function of the interface unit when detecting the anomaly, wherein:
   the external device is operable by the user through the interface unit, and controls a travelling of a vehicle;
   the interface unit includes a display and a touch panel superimposed over a display screen of the display;

the detecting of the anomaly includes separately detecting both the display anomaly and the touch panel anomaly;

the display anomaly is a state in which a figure to be displayed on the display is not displayed;

the touch panel anomaly is a state in which the touch panel cannot be operated; and when the automatic stop control is in an on state, the vehicle control ECU turns off the automatic stop control in a case where the display anomaly is detected and/or a case where the touch panel anomaly is detected.

* * * * *